(12) United States Patent
Nakatani et al.

(10) Patent No.: US 9,889,506 B2
(45) Date of Patent: Feb. 13, 2018

(54) VIBRATION-PROOF STRUCTURE OF ROTATING BODY

(71) Applicant: Daishowa Seiki Kabushiki Kaisha, Higashiosaka-shi (JP)

(72) Inventors: Joji Nakatani, Higashiosaka (JP); Yasuyuki Ishida, Higashiosaka (JP)

(73) Assignee: Daishowa Seiki Kabushiki Kaisha, Osaka (JP)

(*) Notice: Subject to any disclaimer, the term of this patent is extended or adjusted under 35 U.S.C. 154(b) by 0 days.

(21) Appl. No.: 15/320,988

(22) PCT Filed: May 29, 2015

(86) PCT No.: PCT/JP2015/065552
§ 371 (c)(1),
(2) Date: Dec. 21, 2016

(87) PCT Pub. No.: WO2015/198792
PCT Pub. Date: Dec. 30, 2015

(65) Prior Publication Data
US 2017/0197251 A1 Jul. 13, 2017

(30) Foreign Application Priority Data

Jun. 25, 2014 (JP) .................................. 2014-130541

(51) Int. Cl.
B23B 27/00 (2006.01)
B23B 29/02 (2006.01)
(Continued)

(52) U.S. Cl.
CPC .......... *B23B 29/022* (2013.01); *B23B 27/002* (2013.01); *B23B 2229/00* (2013.01);
(Continued)

(58) Field of Classification Search
CPC ..... B23B 29/022; B23B 27/002; B23B 29/12; B23B 2251/70; B23B 2250/16;
(Continued)

(56) References Cited

U.S. PATENT DOCUMENTS 3,242,791 A    3/1966 Smith
3,690,414 A *  9/1972 Aggarwal .......... B23Q 11/0032
                                                  188/378
(Continued)

FOREIGN PATENT DOCUMENTS

JP     S62-32702 U    2/1987
JP     H03-36701 U    4/1991
(Continued)

*Primary Examiner* — Daniel Howell
*Assistant Examiner* — Yasir Diab
(74) *Attorney, Agent, or Firm* — Dilworth & Barrese, LLP

(57) ABSTRACT

Provided is a vibration-proof structure capable of more effectively reducing rotational vibration of a rotating body during a cutting operation. According to a configuration of the structure, inside a main body of the rotating body, there are provided a plurality of shaft members arranged along a longitudinal direction of a rotation axis of the rotating body and at least one layer of multiple tubular members fitted over the shaft members and arranged coaxially with the rotation axis along the longitudinal direction of this rotation axis; and a boundary position between the shaft members adjacent each other in the longitudinal direction and a boundary position between the tubular members adjacent each other in the longitudinal direction are set as different positions along the longitudinal direction.

6 Claims, 4 Drawing Sheets

(51) Int. Cl.
 *B23C 5/00* (2006.01)
 *B23Q 11/00* (2006.01)

(52) U.S. Cl.
 CPC ....... *B23B 2250/04* (2013.01); *B23B 2250/16* (2013.01); *B23B 2251/70* (2013.01); *B23C 5/003* (2013.01); *B23D 2277/10* (2013.01); *B23Q 11/0032* (2013.01); *B23Q 11/0039* (2013.01)

(58) Field of Classification Search
 CPC . B23B 2250/04; B23C 5/003; B23Q 11/0035; B23Q 11/0032; B23Q 11/0039; B23D 2277/10
 See application file for complete search history.

(56) References Cited

U.S. PATENT DOCUMENTS

| | | | | |
|---|---|---|---|---|
| 4,285,260 A | * | 8/1981 | Salje | B23D 61/026 144/218 |
| 4,338,758 A | * | 7/1982 | Hagbjer | F16F 9/30 188/268 |
| 5,030,490 A | * | 7/1991 | Bronowicki | B32B 3/14 188/268 |
| 5,342,465 A | * | 8/1994 | Bronowicki | B32B 3/14 156/173 |
| 5,507,477 A | * | 4/1996 | Manning | F16F 3/093 188/378 |
| 2006/0275090 A1 | | 12/2006 | Onozuka et al. | |
| 2009/0003947 A1 | * | 1/2009 | Haimer | B23B 29/12 408/143 |
| 2013/0206525 A1 | | 8/2013 | Ogata | |

FOREIGN PATENT DOCUMENTS

| | | |
|---|---|---|
| JP | 2006-305674 A | 11/2006 |
| JP | 2012-57752 A | 3/2012 |

* cited by examiner

VIBRATION-PROOF STRUCTURE OF ROTATING BODY

TECHNICAL FIELD

The present invention relates to a vibration-proof structure of a rotating body which prevents vibration at the time of a rotary machining operation.

BACKGROUND ART

Conventionally, as a device for cutting a work formed of a metal or the like, there is known a device configured to hold an end portion side of a tool holder with a cutting blade portion fixed to its leading end and to rotate this tool holder. Such device suffers a problem that when the blade portion on the leading end side comes into contact with a work, the tool holder is bent and deformed to cause vibration in the tool holder, thus leading to reduction in machining precision. Such vibration differs in its mode, depending on the length or outer dimensions of the tool holder or property of material constituting the tool holder, etc.

For this reason, e.g. Patent Document 1 shows a case in which for obtaining a large damping ratio for a wide range of vibration frequency, a boring bar for use in a boring operation is formed with using a plurality of layers of cylindrical members arranged coaxially with each other. According to a mechanism disclosed in this document, when a work is cut by this boring bar, the cutting force will be transmitted in the mutually engaged cylindrical members one after another to eventually reach a spindle. In the course of this, slight displacement will occur between the adjacent cylindrical members, thus causing friction between the multiple-layered members, which will dissipate the energy quickly.

Further, Patent Document 2 discloses a case in which a boring bar is constituted of a boring bar head connecting a leading end portion and a base end portion of the boring bar with a clamping bolt and a plurality of thin hollow bars that are arranged in multiple layers over the clamping bolt between the leading end portion and the base end portion. Around the outer circumferences of these thin hollow bars, an outer tube is provided, so that a screw or the like provided in this outer tube is used for fastening center portions of the thin hollow bars. With this fastening, the plurality of thin hollow bars arranged in the multiple layers are brought into contact with each other to generate a friction, which in turn absorbs vibration.

CITATION LIST

Patent Literature

Patent Document 1: Japanese Unexamined Utility Model Publication No. S62-32702
Patent Document 2: Japanese Unexamined Utility Model Publication No. H3-36701

SUMMARY OF INVENTION

Technical Problem

In the tool disclosed in Patent Document 1, all of the cylindrical members arranged in the multiple layers have a same length along the longitudinal direction. Also, the cylindrical members disposed adjacent in the inner-outer direction are bonded to each other at a plurality of positions. Therefore, relative movement between the cylindrical members is significantly limited. For this reason, when vibration occurs in the boring bar during a cutting operation, bending deformation in the boring bar is relieved by the respective cylindrical members integrated together by the multi-layered arrangement and then the vibration is absorbed merely by slight friction occurring between the cylindrical members.

Further, in the case of Patent Document 2, it is believed that the vibration absorbing function will vary by varying the strength of fastening of the plurality of thin hollow bars by the screw or the like. Then, if they are fastened strongly, the respective thin hollow bars will be more integrated to each other, so that the friction between the respective members will occur less likely, thus resulting in deterioration in the vibration absorbing characteristics. On the other hand, if they are fastened weakly, the friction between the respective members will occur more easily, but on the other hand, bending deformation in the respective thin hollow bars will occur more likely. As a result, vibration of the cutting portion cannot be absorbed.

The present invention has been made in view of the above-described state of the art and its object is to provide a vibration-proof structure capable of more effectively reducing rotational vibration of a rotating body during a cutting operation.

Solution to Problem

According to a characterizing feature of a vibration-proof structure of a rotating body comprises:

inside a main body of the rotating body, there are provided a plurality of shaft members arranged along a longitudinal direction of a rotation axis of the rotating body and at least one layer of multiple tubular members fitted over the shaft members and arranged coaxially with the rotation axis along the longitudinal direction of the rotation axis; and a boundary position between the shaft members adjacent each other in the longitudinal direction and a boundary position between the tubular members adjacent each other in the longitudinal direction are set as different positions along the longitudinal direction.

With the above-described arrangement of causing a boundary position between the shaft members and a boundary position of the tubular members to be different from each other, tendency of mutual movement in the radial direction between the shaft members or between the tubular members due to rotational vibration can be effectively suppressed by a tubular member opposed to the boundary position between the shaft members or by a shaft member opposed to the boundary position between the tubular members.

For instance, when relative movement tends to occur between the shaft members adjacent each other in the longitudinal direction, firstly, either one shaft member will press a tubular member disposed on its outer side. Yet, movement of this pressed tubular member will be checked by the other shaft member. Therefore, the relative movement between the adjacent shaft members will be suppressed as a result. In this, the relative position between the shaft member and the tubular member will change slightly, thus causing friction between these members. And, this friction serves to effectively absorb the vibration of the rotating body.

According to a further characterizing feature of the present invention, the total number of the tubular members is set smaller than the total number of the shaft members.

With the above-described arrangement of setting the total number of the tubular members smaller than the total number of the shaft members, it becomes easier to set a length of at least one tubular member longer than a length of any one of the shaft members. An object is subject to an inertial movement of a rotation system. And, its magnitude increases in direct proportion to the mass of the object and square of the radius of rotation. Therefore, by increasing the length of the tubular member which is disposed on the outside of the rotation radius, it becomes possible to increase the mass of the tubular member and the inertial moment, thereby to improve the stability of rotation. On the other hand, the rotation radius of the shaft member disposed on the inner side is small and its length in the longitudinal direction is also short. Therefore, the inertial moment is kept small. In this way, by providing a difference between the inertial moment of the shaft member and the inertial moment of the tubular member, it becomes possible to allow a relative movement between the shaft member and the tubular member to occur positively when vibration occurs in the rotating body, thereby to increase the friction occurring between these members for more effective absorption of the rotating body.

According to a further characterizing feature of the present invention, an elastic seal is disposed between the shaft members and the tubular members.

With the above-described arrangement of disposing an elastic seal between the shaft members and the tubular members, when vibration occurs in the rotating body, displacement of the shaft members is transmitted to the tubular members via the elastic seal, and movement of the shaft members is limited by the rotational inertia of the tubular members. With this, vibration of the rotating body can be reduced.

According to a further characterizing feature of the present invention, at the boundary position between the shaft members and at the boundary position between the tubular members, an elastic seal is disposed respectively.

With the above arrangement, the elastic seal disposed at the boundary position between the shaft members or the boundary position between the tubular member is subjected to a predetermined elastic compression between the shaft members or tubular members. Therefore, when the rotating body is still or the tool attached to the rotating body is machining a work without vibration, no relative movement occurs in the shaft members or tubular members. With this, the shaft members and the tubular members can be maintained in a predetermined positional relation to each other.

According to a further characterizing feature of the present invention, a radial thickness of the tubular member is set greater than a radial thickness of the shaft member.

With the above-described arrangement, the mass of the tubular member is increased relative to the mass of the shaft member. With this, the inertial moment of the tubular member is increased, so that the rotational state of the tubular member is stabilized. As a result, the vibration absorbing function of the rotating body can be enhanced.

According to a further characterizing feature of the present invention, there are provided three of the tubular members and a radial thickness of the tubular member disposed at the center in the longitudinal direction is set greater than a radial thickness of the other tubular members.

When vibration occurs in the rotating body such as a tool holder, the amount of displacement is larger at the center position in the longitudinal direction. With the above-described arrangement, three tubular members are provided as a set and the radial thickness of the tubular member disposed at the center in the longitudinal direction is set greater than the radial thickness of the other tubular members. With this, the inertial moment of the tubular member disposed at such center region is increased, so that the vibration absorbing function of the rotating body can be enhanced.

DESCRIPTION OF EMBODIMENTS

Next, embodiments of the present invention will be explained with reference to the drawings.

First Embodiment

Figure 1:
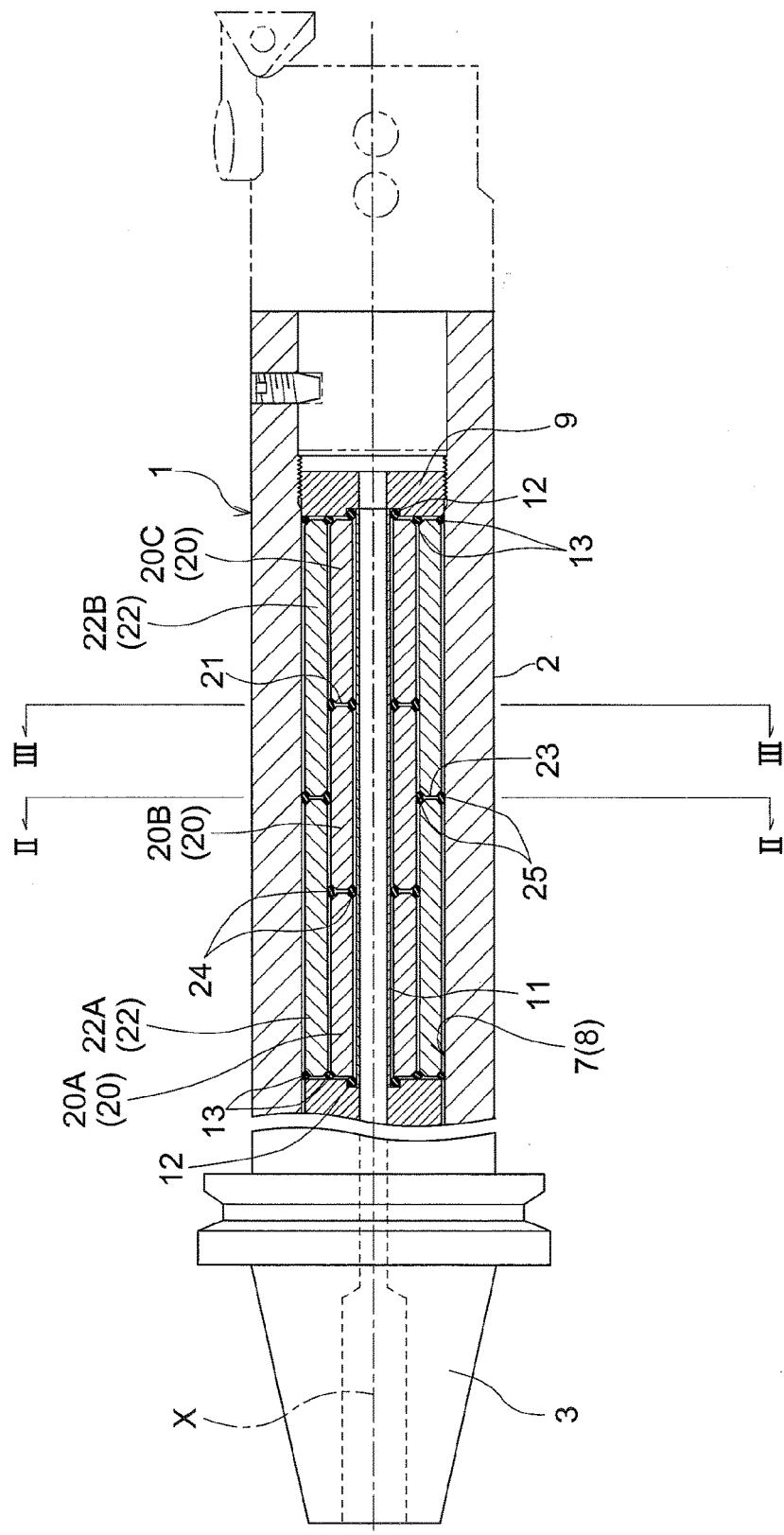
FIG. 1 is a vertical section of a tool holder having a vibration-proof structure.
Figure 2:
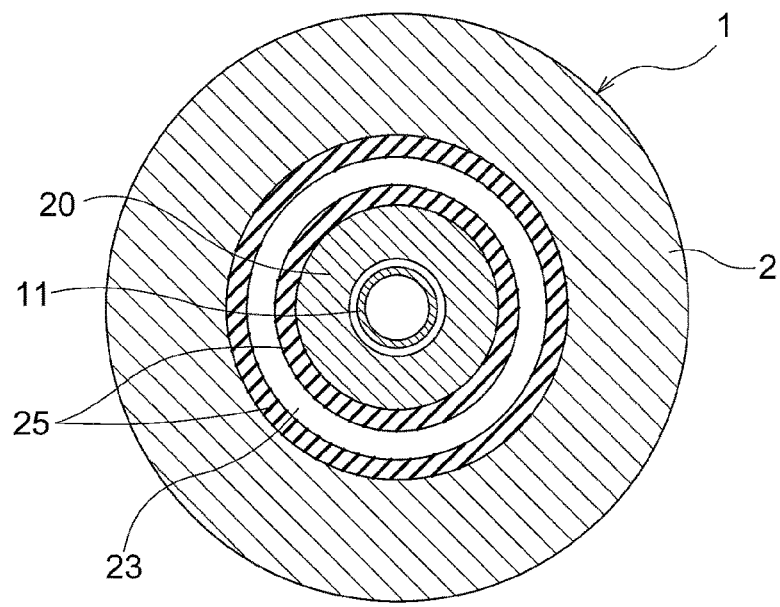
FIG. 2 is a section taken along a line II-II in FIG. 1.
Figure 3:
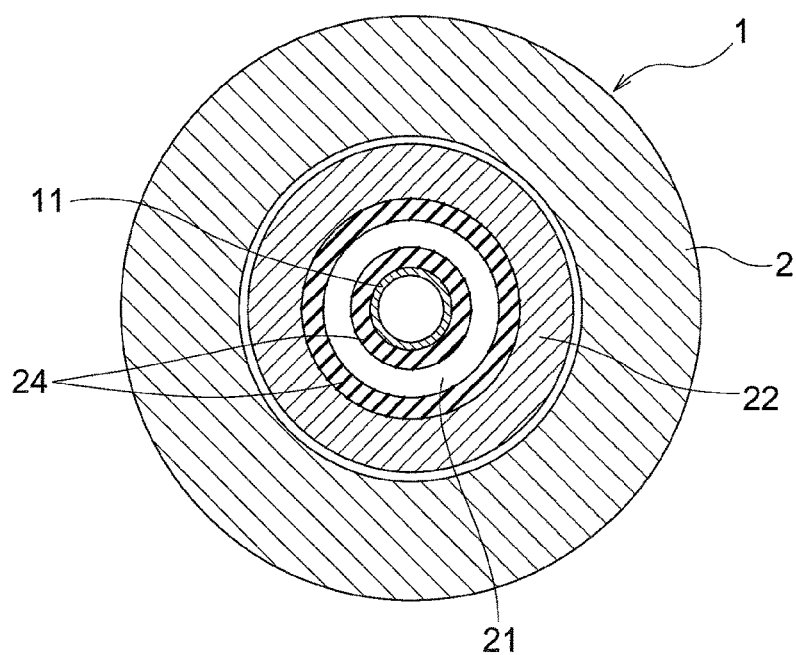
FIG. 3 is a section taken along a line III-III in FIG. 1.

FIGS. 1 through 3 show a tool holder 1 (an example of "a rotating body") having a vibration-proof structure according to the present invention.

This tool holder 1 is for a boring machining operation and includes a cylindrical elongate main body 2 to which a tool is attached, and a tapered shank portion 3 to be gripped to a spindle (not shown) of a machine tool.

The main body 2 includes therein a cylindrical hollow portion 7. This hollow portion 7 is formed by a shaft hole 8 which opens wide toward the leading end of the main body 2. In the shaft hole 8, a coolant pipe 11, shaft members 20 and tubular members 22 are disposed coaxially in the order from the center side of the hole.

On the outer circumference side of the coolant pipe 11, a plurality of cylindrical shaft members 20 are arranged along a longitudinal direction of a rotation axis X. FIG. 1 shows an example wherein three such shaft members 20 are disposed. On further outer side of the shaft members 20, there are fitted a plurality of tubular members 22 coaxial with the rotation axis X. FIG. 1 shows two such tubular members 22.

After the coolant pipe 11, the shaft members 20 and the tubular members 22 are inserted into the shaft hole 8, these will be fixed by a plug member 9. In the outer circumference face of the plug member 9, a male thread portion is formed. And, this plug member 9 will be threaded with a female thread portion formed in the inner circumference face of the shaft hole 8. By the bottom of the shaft hole 8 and the plug member 9, the coolant pipe 11, the shaft members 20 and the tubular members 22 are pressed against and fixed to each other along the rotation axis X.

As the shaft members 20, as shown in FIG. 1, three members 20A-20C having an equal length are disposed along the longitudinal direction. On the other hand, as the tubular members 22, two members 22A, 22B of an equal length are disposed. Since a disposing area for the shaft members 20 and a disposing area for the tubular members 22 in the shaft hole 8 have an equal length, each length of the tubular members 22 is longer than each length of the shaft members 20. As for the total numbers, the total number of the tubular members 22 becomes necessarily smaller.

With the above-described arrangement, a boundary position 21 between mutually adjacent shaft members 20 and a boundary position 23 between mutually adjacent tubular members 22 become different from each other along the longitudinal direction. The shaft members 20 and the tubular members 22 can be formed of a material having appropriate dumping property, such as a metal material. In this regard, the shaft members 20 and the tubular members 22 can be formed of a same material or different materials from each other.

As shown in FIG. 1, at positions where the shaft member 20 and the tubular member 22 are placed in contact with the shaft member 20 or the tubular member 22 adjacent thereto, or at positions where the shaft member 20 or the tubular member 22 is placed in contact with the plug member 9, the main body 2 or the coolant pipe 11, elastic seals 24, 25 are disposed. Thus, the main body 2, the shaft members 20 and the tubular members 22 are fitted to each other via the elastic seals 24, 25.

These elastic seals 24, 25 are disposed between the shaft members 20 or the tubular members 22 and are subjected to a predetermined elastic compression. Thus, when the tool holder 1 is kept still or is effecting a cutting operation on a work without vibration, no relative movement occurs in the shaft members 20 or the tubular members 22, and a predetermined positional relation is maintained. Therefore, under this normal state, no contact occurs between the members disposed within the shaft hole 8.

However, if vibration occurs in the tool holder 1 in the course of a cutting operation of a work, the elastic seals 24, 25 will be further deformed, so that the shaft members 20 or the tubular members 22 come into contact with each other.

In the course of the above, displacement of the shaft members 20 will be transmitted to the tubular members 22 via the elastic seals 24, 25, and rotational inertia of the tubular members 22 limit movement of the shaft members 20, thus reducing the vibration. Further, if the shaft member 20 comes into contact with the tubular member 22, friction occurs therebetween and movement of the shaft member 20 will be converted into heat or sound, thereby to reduce the vibration.

Incidentally, FIG. 1 shows an exemplary case in which two elastic seals 24, 25 are disposed on the outer face side and on the inner face side of the shaft members 20 or the tubular members 22. Alternatively, it is also possible to employ one elastic seal having a thickness slightly greater than the thickness of the shaft member 20 or the tubular member 22.

At a boundary portion between the coolant pipe 11 and the plug member 9, an elastic seal 12 is provided. And, at a boundary portion between the plug member 9 and the shaft member 20 and at a boundary portion between the plug member 9 and the tubular member 22, an elastic seal 13 is provided respectively. These elastic seals 12, 13 provide not only a function of maintaining the positional relation between the members, but also a function of preventing coolant from entering the disposing area of the shaft member 20 or the tubular member 22. With such prevention of entrance of coolant, displacement of the shaft member 20 or the tubular member 22 will not be hindered, so that favorable vibration-proof effect can be maintained.

As shown in FIG. 1, a boundary position 21 between the shaft members 20 and a boundary position 23 between the tubular members 22 are set as different positions along the longitudinal direction. With this arrangement, for instance, when the shaft member 20A of the shaft members 20A, 20B adjacent each other in the longitudinal direction tends to displace in the radial direction, this will press the tubular member 22A disposed on the outer side of the shaft member 20A. Although this tubular member 22A tends to displace in the same direction, the shaft member 20B adjacent the shaft member 20A checks movement of the tubular member 22A. In this way, even if movement in the radial direction occurs in a particular shaft member 20 or tubular member 22, such movement will be checked by the adjacent other shaft member 20 or tubular member 22. Consequently, vibration of the tool holder 1 will be absorbed.

Second Embodiment

Figure 4:
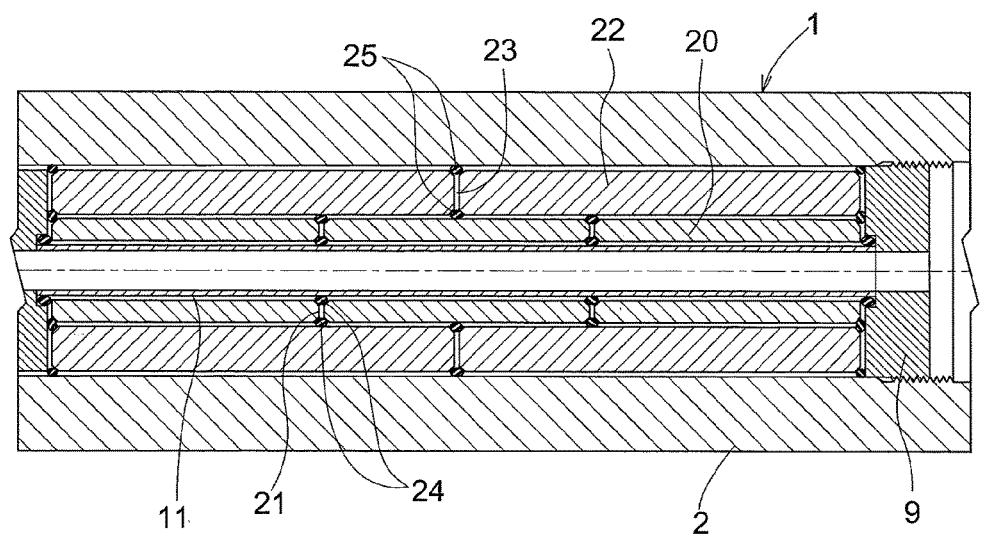
FIG. 4 is a vertical section showing a vibration-proof structure according to a second embodiment.

A second embodiment of the present invention is shown in FIG. 4. Here, a radial thickness of the tubular member 22 is set greater than a radial thickness of the shaft member 20. With this arrangement, the mass of the tubular member 22 is increased relative to the mass of the shaft member 20. Therefore, the inertial moment of the tubular member 22 is increased, so that the rotational state of the tubular member 22 is stabilized. As a result, the vibration absorbing function of the tool holder 1 is increased.

Third Embodiment

Figure 5:
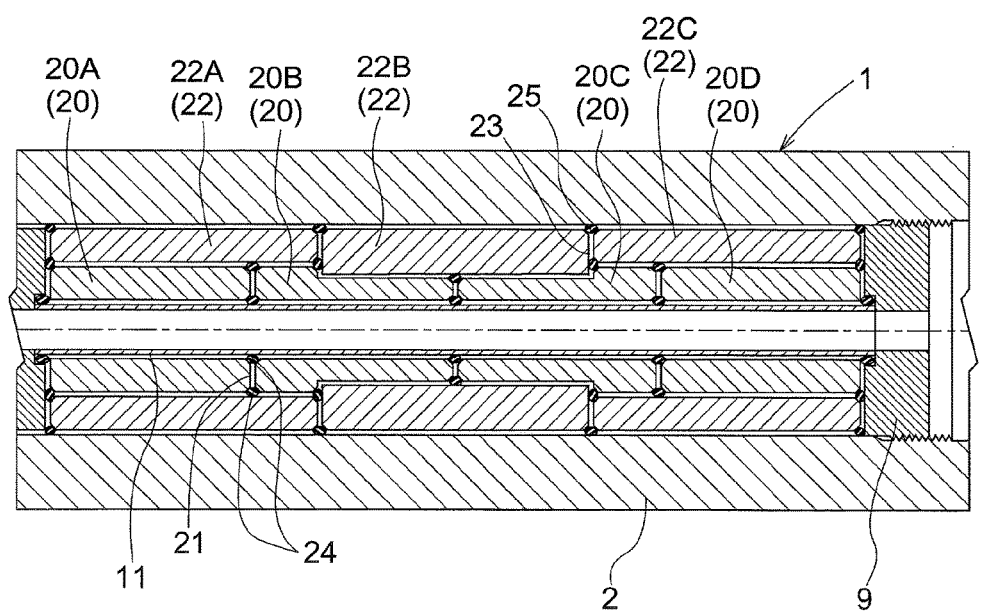
FIG. 5 is a vertical section showing a vibration-proof structure according to a third embodiment.

In this embodiment, as shown in FIG. 5, four shaft members 20 having an equal length a in the longitudinal direction are disposed and also on the outer side thereof, three tubular members 22 of an equal length are disposed. Here, the thickness of the tubular member 22B disposed centrally of the tubular members 22 is set greater than the thickness of the other tubular members 22A, 22C. As for the shaft members 20, the members 20A, 20D disposed at the extreme ends have a same thickness, whereas the center (intermediate) members 20B, 20C have a thickness which decreases at the center side in the longitudinal direction.

When vibration occurs in the tool holder 1, the amount of displacement will be larger at the longitudinal center position. Therefore, the vibration absorbing function is enhanced by the increase of the inertial moment of the tubular member 22B disposed in this region.

Fourth Embodiment

Figure 6:
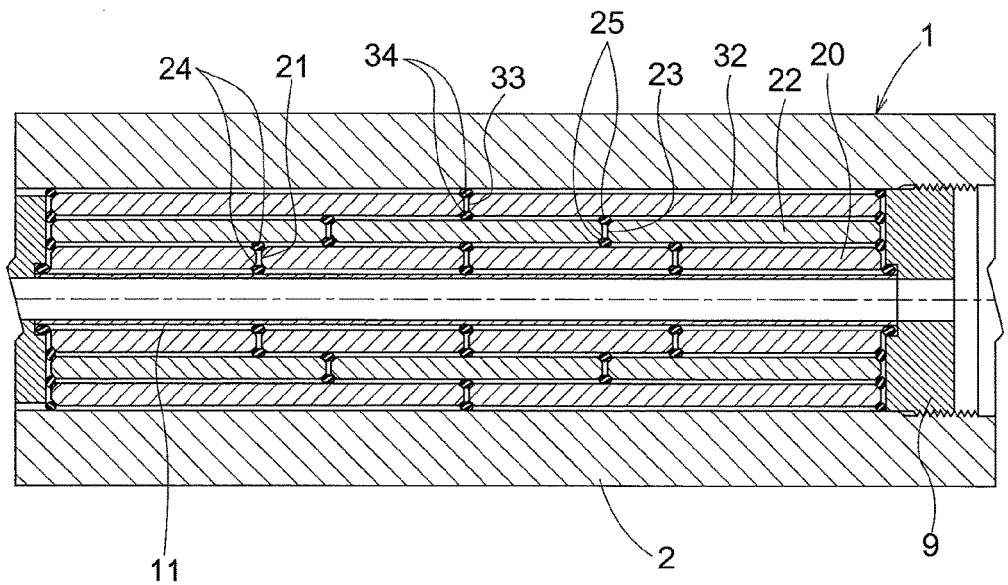
FIG. 6 is a vertical section showing a vibration-proof structure according to a fourth embodiment.

In this embodiment, as shown in FIG. 6, on the outer circumferential side of the shaft member 20, there are disposed two layers of tubular members 22, 32. Regarding the tubular member 22 on the inner side and the tubular member 32 on the outer side too, a boundary position 23 between the tubular members 22 adjacent in the longitudinal direction and a boundary position 33 between the tubular members 32 adjacent in the longitudinal direction are made different from each other along the longitudinal direction. Incidentally, provision of such difference between the boundary positions is limited to the boundary position of members adjacent in the radial direction. As illustrated in FIG. 6, it will not be particularly problematic if the boundary position between the shaft members 20 located centrally in the longitudinal direction and the boundary position between the outer side tubular members 32 are located at a same position in the longitudinal direction.

In this embodiment too, the inertial moment of the outer side tubular member is increased by decreasing the number of outer side tubular members along the longitudinal direction. And, between the outer side tubular members 32, an elastic seal 34 similar to that provided in the foregoing embodiment is provided. Further, the number of layers of the tubular members to be provided on the outer circumferential side of the shaft members 20 can be further increased to be three layers or more.

Fifth Embodiment

Figure 7:
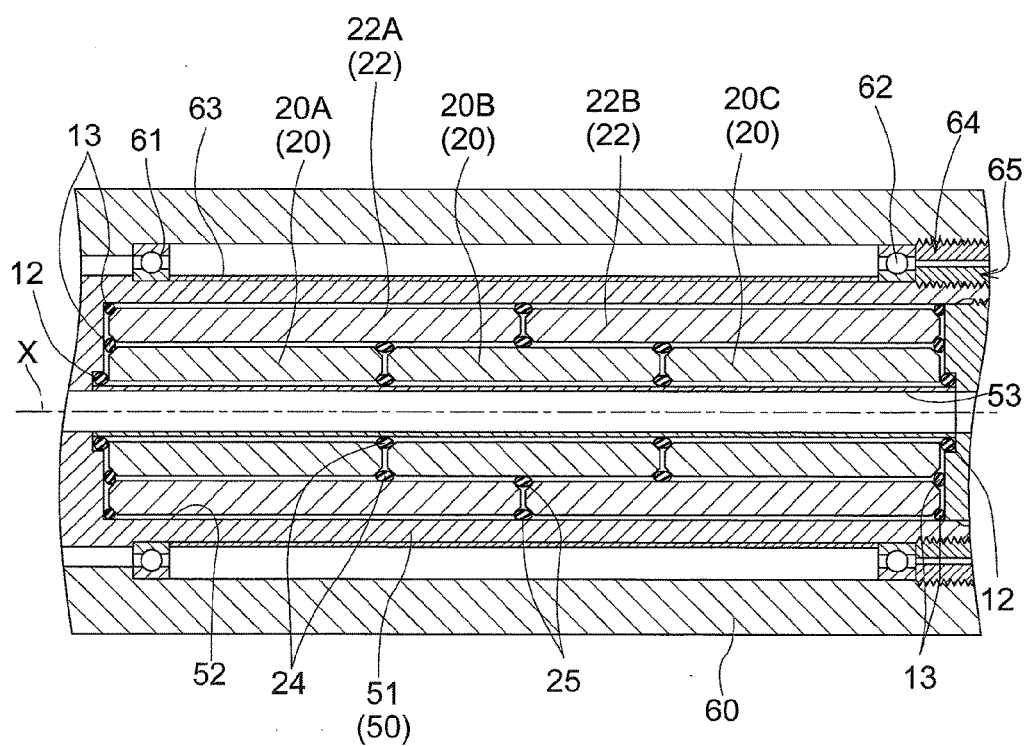
FIG. 7 is a vertical section showing a vibration-proof structure according to a fifth embodiment.

In the foregoing embodiment, there was disclosed a case in which the tool holder 1 is employed as the "rotating body". Instead, as shown in FIG. 7, the rotating body can be a spindle 50 of a machining tool to which a tool holder or the like is to be connected. Such unillustrated tool holder or the like will be connected to one side (e.g. the right side in FIG. 7) of the spindle 50.

The spindle 50 is disposed inside a housing 60 and a spindle body 51 forms a cylindrical hollow portion 52 therein. In this hollow portion 52, a coolant pipe 53, the shaft members 20 and the tubular members 22 will be disposed coaxially.

On the outer circumferential side of the coolant pipe 53, there are disposed the plurality of cylindrical shaft members 20 along the longitudinal direction of the rotation axis X. FIG. 7 shows an exemplary case in which three shaft members 20A-20C are disposed. On the outer side of the shaft members 20, there are fitted a plurality of tubular members 22 coaxially with the rotation axis X. In the example shown in FIG. 7, two such tubular members 22A, 22B are disposed. At positions where the shaft members 20 and the tubular members 22 come into contact with adjacent shaft members 20 or tubular members 22, or at positions where the shaft members 20 or the tubular members 22 come into contact with the spindle body 51, the coolant pipe 53, etc., elastic seals 24, 25 are disposed.

Between the spindle body 51 and the housing 60, bearings 61, 62 are provided along the direction of the rotation axis X. And, a spacer 63 is disposed between the bearing 61 and the bearing 62. On the side of the bearing 62 opposite the spacer 63, a nut 64 is engaged with the housing 60 and a nut 65 is engaged with the spindle body 51. In this way, the bearings 61, 62 are maintained in position on the inner circumferential side of the housing 60 by the spacer 63 and the nuts 64, 65. The spindle 50 can rotate in a stable manner by the bearings 61, 62 and vibration is absorbed by the shaft members 20 and the tubular members 22.

Other Embodiments (1) In the foregoing embodiment, there was shown the exemplary case in which on both the inner circumferential side and outer circumferential side between members arranged along the longitudinal direction (the shaft members 20, the tubular members 22, 32), the elastic seals 24, 25, 34 are provided. However, if non-contact state between the members can be maintained, such elastic seal can be provided only on one of the inner circumferential side and the outer circumferential side. Further, instead of such elastic seals, it is also possible to provide lubricant, viscous material or the like in the gap between the members to prevent direct contact between the members.

(2) In the foregoing embodiment, the shaft members 20 and the tubular members 22 (32) disposed have an equal length in the longitudinal direction. Alternatively, these shaft members 20 or the tubular members 22 can have unequal lengths in the longitudinal direction.

(3) In the foregoing embodiment, there was shown the exemplary case in which the total number of the inner side members (shaft members 20, the tubular members 22) is greater than the total number of the outer side members (tubular members 22, 32) adjacent the inner side members. Alternatively, the total number of the inner side members and the total number of the outer side members can be same. In such case, however, in order for the boundary positions therebetween to be different, it will be needed to e.g. render the end position of the inner side member (shaft member 20) and the end position of the outer side member (tubular member 22) different from each other in the longitudinal direction or to vary appropriately dividing sizes of the inner side member and the outer side member in the longitudinal direction.

(4) In the vibration-proof structure according to the present invention, in case three or more shaft members 20 or tubular members 22 (32) are provided, as compared with the rigidness of the end portion side shaft member 20 or tubular member 22 along the longitudinal direction, the rigidness of the center side shaft member 20 or tubular member 22 can be set higher. With this, the shaft member 20 or tubular member 22 becomes less deformable on the center side, so that vibration of the rotating body (the tool holder 1, the spindle 50 of the machining tool) will be suppressed.

(5) In the foregoing embodiment, there was disclosed the exemplary case of the inventive vibration-proof structure in which the shaft members 20 and the tubular members 22 (32) are disposed circumferentially of the tubular coolant pipe 11, 53. Alternatively, in the case of a tool holder 1 or machining tool spindle 50 not requiring coolant supply thereto, the shaft members 20 and the tubular members 22 can be arranged circumferentially of a column-like (solid) member, instead of the cylindrical member.

REFERENCE SIGNS LIST 1 tool holder (rotating body)
2 main body
7 hollow portion
9 plug member
20 shaft member
21, 23, 33 boundary position
22, 32 tubular member
24, 25, 34 elastic seal
50 spindle of machine tool (rotating body)
51 spindle body (main body)
X rotation axis

The invention claimed is:
1. A vibration-proof structure of a rotating body comprising:
   a plurality of shaft members provided inside a main body of the rotating body and arranged along a longitudinal direction of a rotation axis of the rotating body; and
   at least one layer of multiple tubular members provided inside the main body of the rotating body and fitted over the shaft members and arranged coaxially with the rotation axis along the longitudinal direction of the rotation axis;
   wherein a boundary position between the shaft members adjacent each other in the longitudinal direction and a boundary position between the tubular members adjacent each other in the longitudinal direction are set as different positions along the longitudinal direction.
2. The vibration-proof structure of a rotating body according to claim 1, wherein the total number of the tubular members is set smaller than the total number of the shaft members.

3. The vibration-proof structure of a rotating body according to claim 1, wherein an elastic seal is disposed between the shaft members and the tubular members.

4. The vibration-proof structure of a rotating body according to claim 1, wherein at the boundary position between the shaft members and at the boundary position between the tubular members, an elastic seal is disposed respectively.

5. The vibration-proof structure of a rotating body according to claim 1, wherein a radial thickness of the tubular member is set greater than a radial thickness of the shaft member.

6. The vibration-proof structure of a rotating body according to claim 1, wherein there are provided three of the tubular members and a radial thickness of the tubular member disposed at the center in the longitudinal direction is set greater than a radial thickness of the other tubular members.

* * * * *